Feb. 19, 1963  A. DAMMERS  3,077,753
METHOD AND APPARATUS FOR BENDING GLASS
Filed July 1, 1955
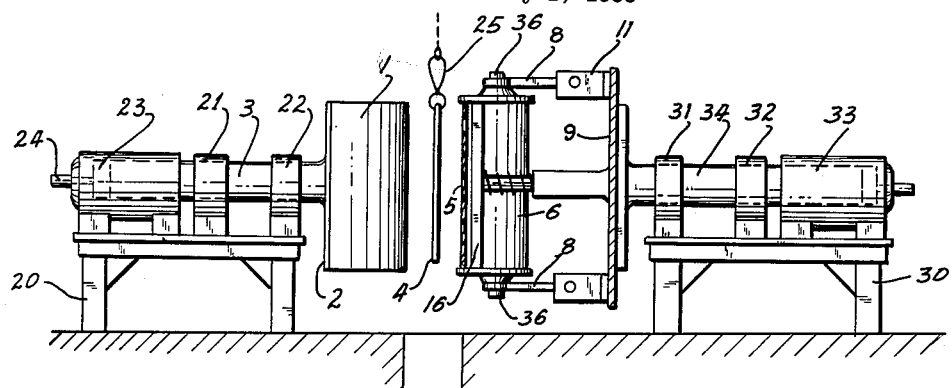
FIG.1
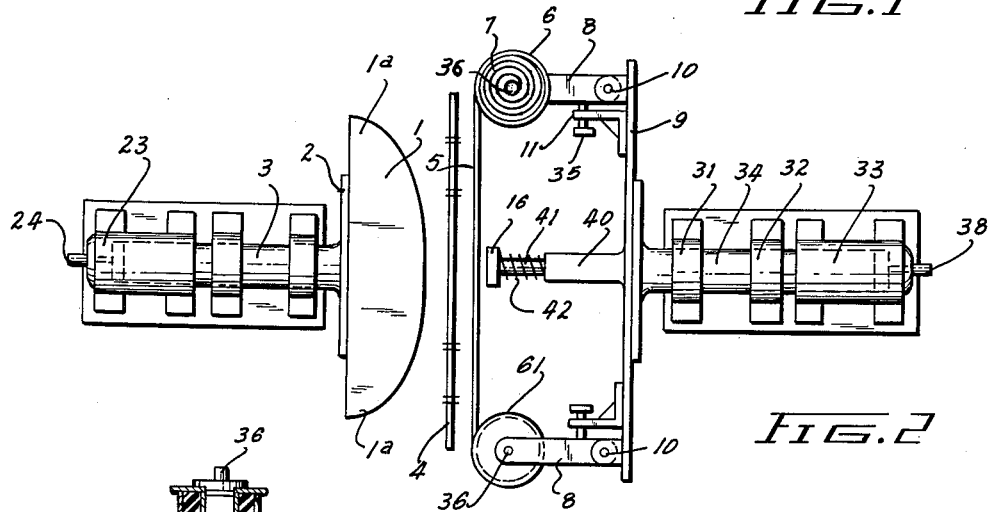
FIG.2
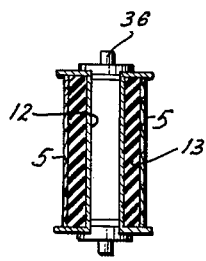
FIG.3
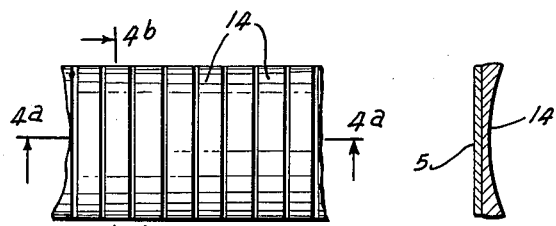
FIG.4   FIG.4b
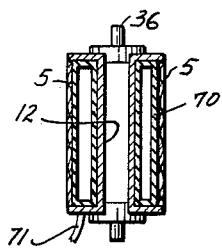
FIG.4a
FIG.5
INVENTOR.
AUGUST DAMMERS
BY
Bauer & Seymour
ATTORNEY

United States Patent Office 3,077,753
Patented Feb. 19, 1963

3,077,753
METHOD AND APPARATUS FOR BENDING GLASS
August Dammers, Herzogenrath-Merkstein, Germany, assignor to Compagnie de St. Gobain, Paris, France
Filed July 1, 1955, Ser. No. 519,590
Claims priority, application France July 8, 1954
17 Claims. (Cl. 65—106)

This invention relates to the bending of glass sheets. The invention involves a new method and novel apparatus, inasmuch as the problems which led to this invention are particularly important in the art of making bent glass sheets, the invention will be described in its relation to that art but this particular description is not to be construed as placing a limitation on the generality of that which is elsewhere stated and claimed herein.

In the manufacture of bent glass sheets, for instance for use as automobile windshields it has been the custom to prepare molds of the required shape, to heat the glass to a temperature approximating its deformation point, to put the sheet between two molds and to press the molds upon the sheet, thus bending it. The central portion of one of the molds engages the central portion of the sheet and the extremities of the other mold engage the opposite ends of the sheet as the molds are pressed upon the sheet.

In this method of bending the glass between two molds of wood or metal of conforming shape it may occur that the produced object presents different thicknesses, which may arise if the two mold halves are not of exactly conforming configuration or cannot be exactly superimposed. These differences in thickness are harmful to the appearance and to the transparency of the bent glass. Furthermore, if it is desired to give a sharp bend, that is a bend on a curve having a relatively short radius, irregularities in the curvature may appear.

It is the object of this invention to improve the bending of glass, to facilitate the bending of glass with compound curvature, to facilitate and improve the bending of glass on short radii, to bend glass without introducing differences in thickness, to eliminate the necessity of constructing conforming convex and concave molds, and to reduce the high cost of molds.

The objects of the invention are accomplished by a novel method which comprises in its preferred form supporting the plate freely at bending temperature in an upright position, gripping a localized part of the plate, preferably a narrow band extending from one edge to the other more or less parallel to the main axis of curvature, and progressively extending the area of gripping pressure in directions departing from the original form of the plate, and conforming to the shape desired in the product, so that the plate is progressively bent in directions extending outwardly from that part of the glass which was originally subjected to gripping pressure.

The novel apparatus of the invention includes a bending form or die having a convex, rigid, plate-shaping face and a cooperating bending form having a flexible plate-shaping face. The rigid die will be made according to any known method for producing the desired curvature or shape in the glass and may be made of those materials which are customarily employed in such service, such as wood and metal. The flexible, plate-forming member is preferably made of a fabric sheet such as a sheet of asbestos or a woven sheet of fiber glass. The apparatus contains many other elements of novelty, but these will be delineated as the description of the invention proceeds.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

FIG. 1 is a vertical, diagrammatic elevational view of apparatus conforming to the invention, partly in section.

FIG. 2 is a diagrammatic plan view of the same apparatus.

FIG. 3 is a vertical sectional view through a modified roller.

FIG. 4 is a plan view of a section of a modified belt.

FIG. 4a is a section on the line 14a, 14a of FIG. 4.

FIG. 4b is a section on line 14b, 14b of FIG. 4.

FIG. 5 is a modification of the apparatus of FIG. 3.

In FIGS. 1 and 2 there is diagrammatically delineated a novel apparatus capable of carrying out the process. On a supporting table 20 are mounted bearings 21, 22 in which is slidably mounted a shaft 3, the left end of which is received in a cylinder 23 and constitutes therein a piston. A compressed air supply pipe 24 is connected to the cylinder. When compressed air is admitted to the cylinder the shaft 3 is moved to the right against the opposition of springs, not shown, which return the shaft 3 to its retracted position as soon as the compressed air is released from the cylinder. Apparatus for feeding compressed air to, and releasing it from such cylinders to actuate such pistons are well known and are incidental to the invention.

Mounted on the right end of the shaft 3 by means of plate 2 is a convex mold or form 1 upon the face of which the sheet of glass 4 is to be bent. As illustrated in the drawing, the mold has a compound curvature about a vertical axis, the elements of its face being vertical and hence parallel to one another. The plate 4 of glass has been heated to bending temperature and is suspended vertically and freely at its upper edge by tongs 25 which are themselves suspended from and are movable along overhead trackage, not shown, so that the plate can first be heated in a furnace to the required temperature and then brought before the bending mold 1 as indicated in FIGS. 1 and 2.

Upon a table 30 are mounted bearings 31, 32 and cylinder 33, which receives as a piston the end of shaft 34, to the left end of which is attached a plate 9. Upper and lower pivoted arms 8 are attached by pivots 10 to the plate 9 at each side thereof. Screws 35 threaded into angle irons 11 attached to plate 9 form adjustable abutments which prevent the arms 8 from pivoting too much toward each other without preventing them from being pivoted away from each other.

At their outer ends the arms 8 receive in bearings the pintles 36 at the ends of vertically positioned rollers 6, 61 upon which are wound the opposite ends of a flexible fabric 5 which is composed of some heat resistant material such as asbestos or fiber glass. The rollers are spring loaded by internal spiral springs 7 away from each other so that they continually maintain the fabric 5 under tension, the degree of which is regulated by the tension at which the springs are set. In FIG. 2 the cap of roller 6 has been removed to show the spring.

FIGS. 1 and 2 show an advantageous structure composed of a bearing 40 for the shaft 41 which carries at its left end a flat bar 16 which is designed to perform a gripping action by pressing a central area of the fabric 5 against the glass 4 and the face of mold 1. The shaft 41 is spring loaded by spring 42 to its outward position. A connection 38 admits compressed air to the cylinder 33 and is preferably supplied by the same valve that controls the air of cylinder 23.

When the glass has been heated to bending temperature and moved between the two forming elements or molds of the apparatus, the rigid mold 1 and the flexible mold 5, the mold halves are moved toward each other and the glass is gripped between their central parts. As they are pressed firmly together the rollers 6 and 61 proceed along the sides of the mold 1, and the fabric 5 bends the glass into conformity with the shape of the face of mold 1. The bending progresses from the central areas which first engage and grip the glass outward toward the ends of the glass, which is quite different from the former system in which the bending pressure was first applied to the outer ends of the glass. The progression of the two molds, the rigid mold and the flexible mold, toward each other continues until the glass has been completely bent to the shape of the mold 1. If desired the bending can be stopped at some intermediate stage, leaving one or both ends of the glass sheet unbent or bent only to the shape of mold 5 at such intermediate stage.

The parts 16, 40, 41 are not essential but are useful. They can be omitted and the process can still be carried out in a satisfactory way.

During the course of the bending the flexible fabric partially unrolls from the two rollers and as is does so is placed under increasing tension by the springs. The bending forms can be moved toward each other by any of the several means, mechanical, pneumatic, electric or hydraulic, used in connection with prior art jaw mechanism.

This process is facilitated by the arrangement of the arms 8 which are mounted so as to pivot about the pintles 10 and which, under the tension of the springs, are brought in contact with the abutments; it is thus possible to bring the rollers 6 and 61 against the lateral parts 1a of the mold 1, the said rollers turning on these lateral parts and the glass being formed to the shape of the mold by this elastic pressure. When the band 5 returns to its initial position, it is rolled up automatically under the action of spring 7.

This process and method can be employed with some modification in the apparatus to produce a bending with a compound curvature, for instance somewhat spherical.

When the transverse curvature of the sheet of glass to be bent is not great, the ability of the band 5 to conform to a transverse curve may be provided by either of the means shown in FIGS. 3 and 5. These figures show two alternative roller structures which may be substituted for the rollers 6 and 61 in the apparatus shown in FIGS. 1 and 2. For simplicity of illustration springs, similar to the springs 7 in the embodiment of FIGS. 1 and 2, which are also used in the embodiments of FIGS. 3 and 5, are omitted in such latter figures.

In FIG. 3 there is shown a roller having an inner sleeve 12 mounted upon a pintle 36. Outwardly of sleeve 12 the roller of FIG. 3 has a sleeve 13 of resilient rubber, the fabric belt 5 being wound upon sleeve 13. The thick elastic wall of sleeve 13 allows the belt 5 to conform to the required transverse curvature of the bending form or die.

In FIG. 5 there is shown a roller having an inner sleeve 12 mounted upon a pintle 36. Outwardly of sleeve 12 the roller of FIG. 5 has a sleeve 70 in the form of a hollow rubber tube which can be inflated with air under pressure through a suitable nipple 71. With the constructions of FIG. 3 and 5, not only is the belt 5 itself enabled to conform transversely to the curved shape of the rigid mold or form, but the surface of the roller engaging belt 5 is also deformed to facilitate such transverse deformation of the belt.

In FIG. 4 is shown an apparatus by which a more extensive lateral or transverse curvature (normal to the plane of the paper in FIG. 2) can be imparted to an object. On the face of the belt 5 are mounted parallel strips of mold material 14, the upper (FIG. 4a) glass sheet-engaging faces of which are conformed, as shown in FIG. 4b, to the lateral curvature desired in the final product. These mold strips can be made of any heat resistant material such as metal, asbestos, glass, wood or the like. As these strips are placed so closely together that they practically engage one another during the bending operation, it is possible to mount them upon a flexible rubber sheet as they will protect the rubber from the direct radiation from the hot sheet. They may likewise be mounted so that the ends of belt 5, on which they are mounted, are carried by spring biased rollers in a manner similar to belt 5 in FIGS. 1 and 2.

This process enables to produce even sharply bent pieces with great precision and without zones of different thickness.

The glass is first applied to the mold by a localized part and the bending effect of the fabric moves outward progressively from that part toward the border. By this means it is possible to produce satisfactory bendings on the order of 90° and with short radii.

This invention increases the ability to produce objects bent on compound curves and about short radii. The process reduces the cost of molds and increases production. The flexible mold member may be used satisfactorily with solid molds of different configurations without change, which eliminates the prior cost of producing molds in conforming pairs.

It is to be understood that various mechanical details can be altered such as by employing counter weights to keep the belt under tension rather than the springs which are shown.

As many apparently widely different embodiments of the present invention may be made without departing from the spirit and scope therof, it is to be understood that the invention is not limited to the specific embodiments.

What is claimed is:

1. Bending apparatus for glass sheet comprising a convex, rigid, bending form and a flexible bending form mounted in cooperating position, means to suspend a glass sheet between the forms, means to move at least one form to press and bend the sheet between the forms, said flexible form comprising a flexible fabric supported at its ends on rollers, said rollers being loaded to tension the flexible fabric, said rollers having an outer layer of thick, flexible rubber.

2. Apparatus for bending glass sheets comprising a convex, rigid, bending form and a flexible bending form mounted in cooperating position, means to suspend a glass sheet between the forms, means to move at least one form to press and bend the sheet between the forms, said flexible form comprising a flexible fabric supported at its ends on rollers, said rollers being loaded to tension the flexible fabric, said rollers comprising flexible air chambers.

3. Bending apparatus for glass sheets comprising a convex, rigid, bending form and a flexible bending form mounted in cooperating position, means to suspend a glass sheet between the forms, means to move at least one form to press and bend the sheet between the forms, said flexible form comprising a flexible fabric supported at its ends on rollers, said rollers being loaded to tension the flexible fabric, said fabric having a bending face comprised of a plurality of parallel strips.

4. Bending apparatus for glass sheet comprising a convex, rigid, bending form and a flexible bending form mounted in cooperating position, means to suspend a glass sheet between the forms, means to move at least one form to press and bend the sheet between the forms, said flexible form comprising a flexible fabric supported at its ends on rollers, said rollers being loaded to tension the flexible fabric, said fabric having a bending face comprised of a plurality of parallel strips having a concave shape conforming to the convexity of the convex form.

5. Bending apparatus for glass sheets comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on tensioning means releasably loaded to tension the flexible sheet.

6. Bending apparatus for glass sheets or plates comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on rollers, said rollers being loaded to tension the flexible sheet, and mounted on pivoted arms disposed in order to substantially align the rollers with the opposite extremities of the convex form.

7. Bending apparatus for glass sheet comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on rollers, said rollers being loaded to tension the flexible sheet, and spring pressed bracing means located between the rollers behind the flexible sheet.

8. Apparatus for bending glass sheets which comprises a bending form having a convex, rigid, sheet shaping face, a cooperating bending form, the portion of said cooperating bending form which engages and applies pressure on the glass sheet consisting of a flexible sheet provided with tensioning means, means to suspend a glass sheet, and means to bring the bending forms against opposite sides of the glass sheet with bending pressure.

9. Bending apparatus for glass sheets comprising a bending form having a convex, rigid, sheet shaping face, a cooperating bending form, the portion of said cooperating bending form which engages and applies pressure on the glass sheet consisting of a flexible sheet provided with tensioning means, means to suspend a sheet at bending temperature between the forms, means to bring the forms against opposite sides of the sheet with bending pressure, said shaping forms being supported on pistons, and means for moving a piston to bend the glass sheet between the forms.

10. Bending apparatus for glass sheet comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on rollers, said rollers being provided with means to tension the flexible sheet, said rollers having an outer layer of thick, flexible rubber.

11. Apparatus for bending glass sheets comprising a convex, rigid bending form and a flexible bending form mounted in cooperating positions, means to suspend a glass sheet between the forms, means to move at least one form to press and bend the sheet between the forms, said flexible form comprising a flexible sheet supported at its ends on rollers, said rollers being provided with means to tension the flexible sheet, said rollers comprising flexible air chambers.

12. Bending apparatus for glass sheets comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on rollers, said rollers being provided with means to tension the flexible sheet, said flexible sheet having a bending face comprised of a plurality of parallel strips.

13. Bending apparatus for glass sheets comprising a convex, rigid bending form and a flexible bending form mounted in cooperating position, means to suspend a glass sheet between the forms, means to move at least one form to press and bend the sheet between the forms, said flexible form comprising a flexible sheet supported at its ends on rollers, said rollers being provided with means to tension the flexible sheet, said flexible sheet having a bending face comprised of a plurality of parallel strips having a concave shape.

14. Apparatus for bending glass sheets that comprises a first bending form having a convex, rigid, sheet shaping face, a cooperating second bending form, the active portion of said cooperating bending form which engages and applies pressure on the glass sheet consisting of a flexible sheet supported only at its ends and provided with tensioning means, and a means located behind the flexible sheet having means to press an area of said flexible sheet toward the first bending form.

15. Bending apparatus for glass sheets comprising a convex, rigid, bending form and a flexible bending form mounted in cooperating position, means to dispose a glass sheet between the forms, means to move at least one form to press and bend the sheet between the forms, said flexible form comprising a flexible sheet supported at its ends on rollers, said rollers being provided with means to tension the flexible sheet.

16. Apparatus for bending glass sheets which comprises a bending form having a convex, rigid, sheet shaping face, a cooperating bending form, the portion of said cooperating bending form which engages and applies pressure on the glass sheet comprising a flexible sheet provided with tensioning means, means to dispose a glass sheet between the forms, means to move at least one form to press and bend the sheet between the forms, and resiliently pressed bracing means located behind the flexible sheet.

17. A method of bending a glass sheet which comprises freely suspending said glass sheet in a vertical position, heating the sheet to bending temperature while the sheet is free from any substantial bending pressure, thereafter clamping and bending a portion of the glass sheet between a rigid convex die and a flexible sheet yieldingly maintained under tension, and moving at least one of the die and flexible sheet toward the other to extend the area of clamping of the glass sheet and progressively to bend the glass sheet into conformity with the convex die.

References Cited in the file of this patent

UNITED STATES PATENTS

| | | |
|---|---|---|
| 305,707 | Norwood | Sept. 23, 1884 |
| 1,751,430 | Thomson | Mar. 18, 1930 |
| 1,889,881 | Thompson | Dec. 6, 1932 |
| 2,021,118 | Tinkham | Nov. 12, 1935 |
| 2,167,428 | Trabucco | July 25, 1939 |
| 2,182,448 | Paddock | Dec. 5, 1939 |
| 2,239,546 | Black et al. | Apr. 22, 1941 |
| 2,263,005 | McClure | Nov. 18, 1941 |
| 2,418,100 | Stewart | Mar. 25, 1947 |
| 2,518,918 | Mauge | Aug. 15, 1950 |
| 2,526,359 | Jendrisak | Oct. 17, 1950 |
| 2,560,599 | Ryan | July 17, 1951 |
| 2,663,974 | Thomson | Dec. 29, 1953 |
| 2,846,819 | Baker | Aug. 12, 1958 |

FOREIGN PATENTS

| | | |
|---|---|---|
| 943,974 | France | Oct. 18, 1948 |